Feb. 15, 1927.
G. C. G. GRAY
1,617,591
AUTOMATIC COMBUSTION CONTROL FOR STEAM BOILERS
Filed May 24, 1921
3 Sheets-Sheet 3
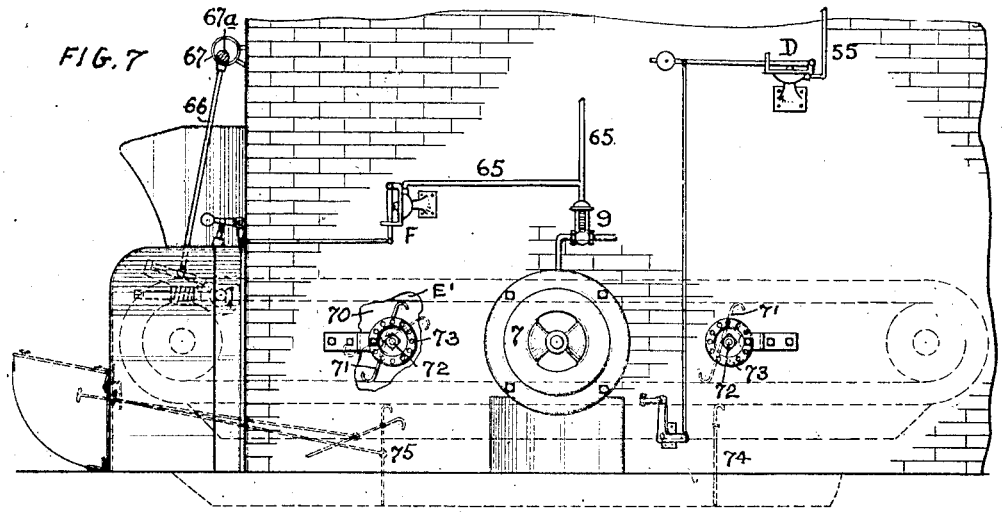
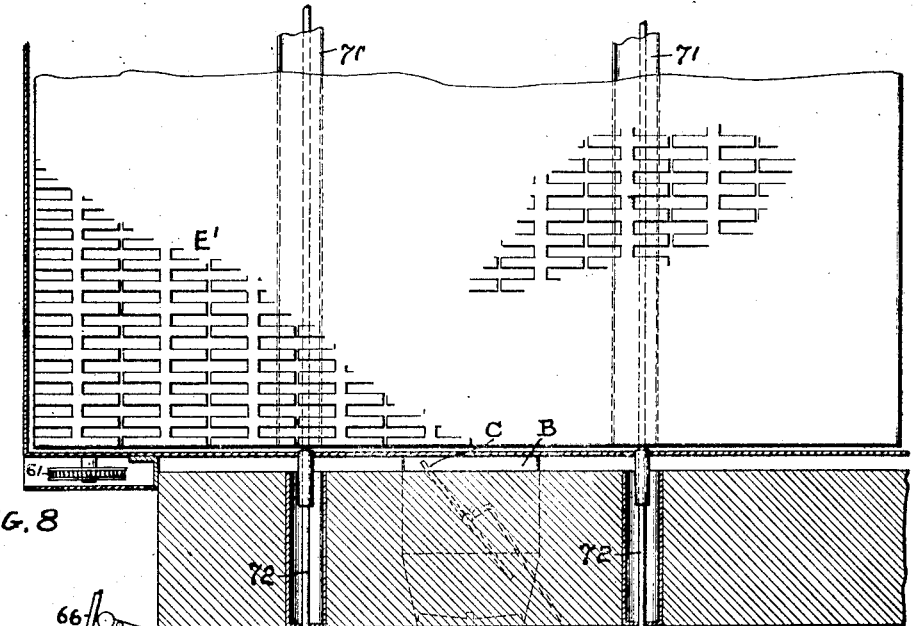
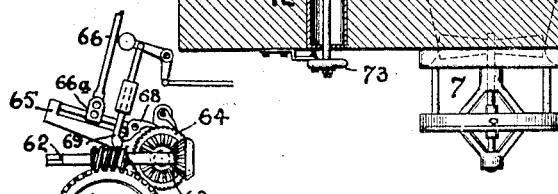
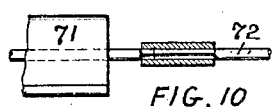
Inventor
George C. G. Gray Patented Feb. 15, 1927.

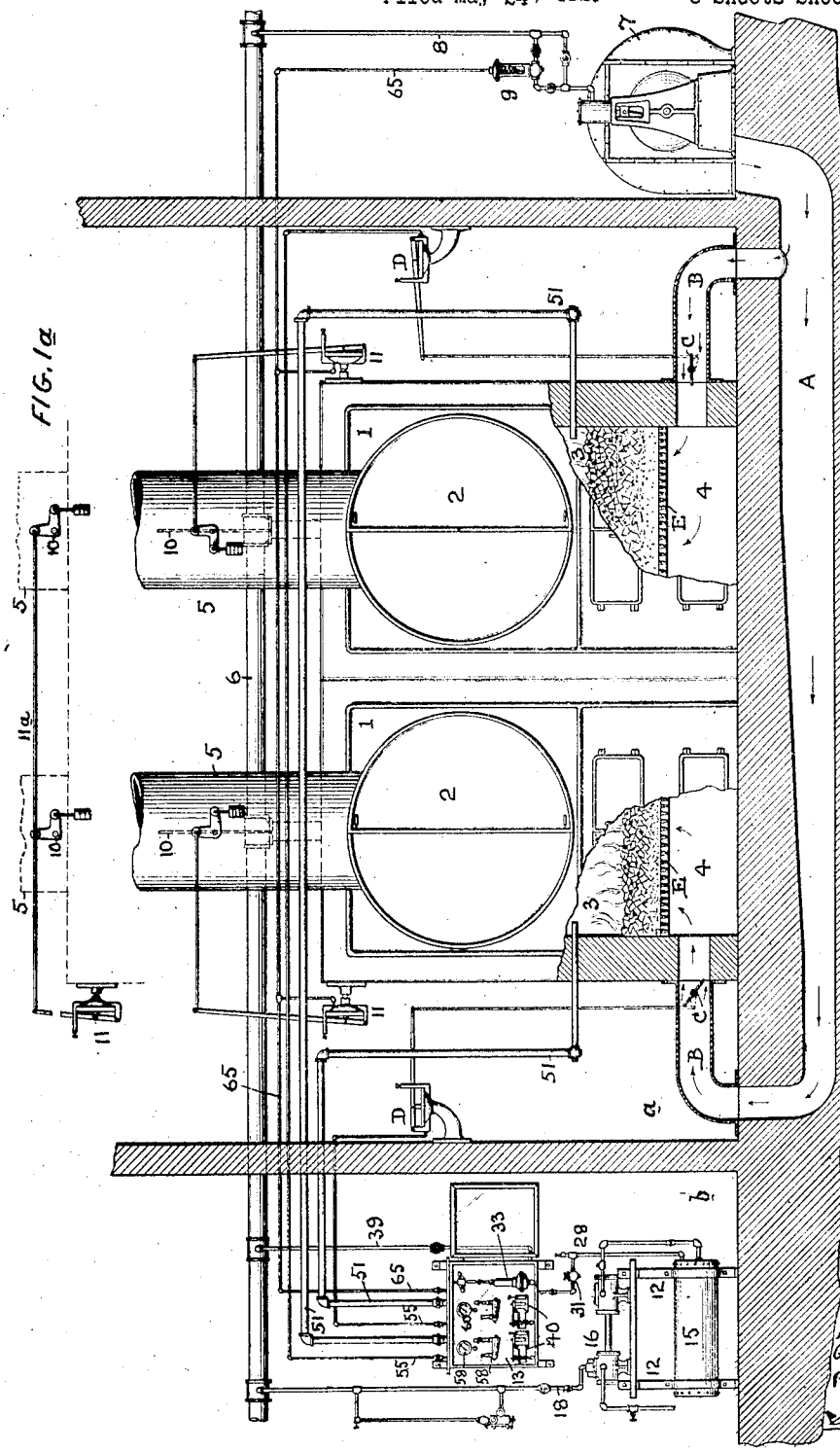

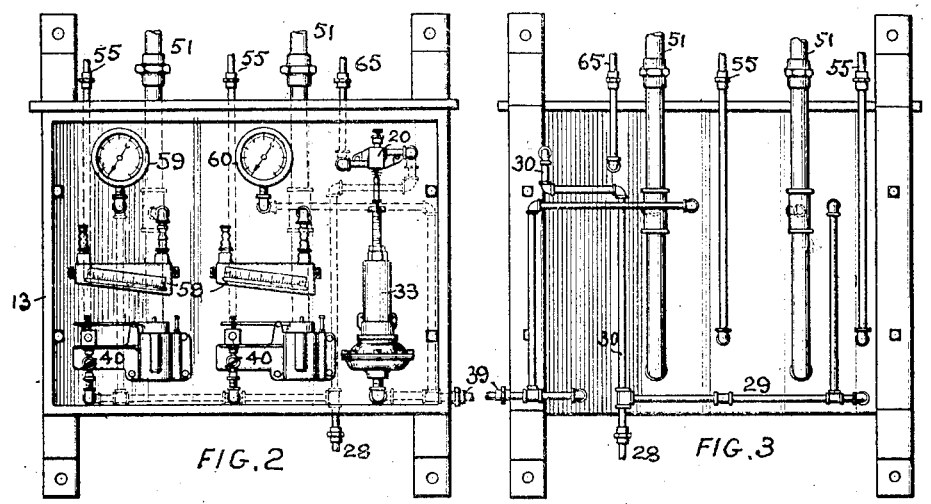
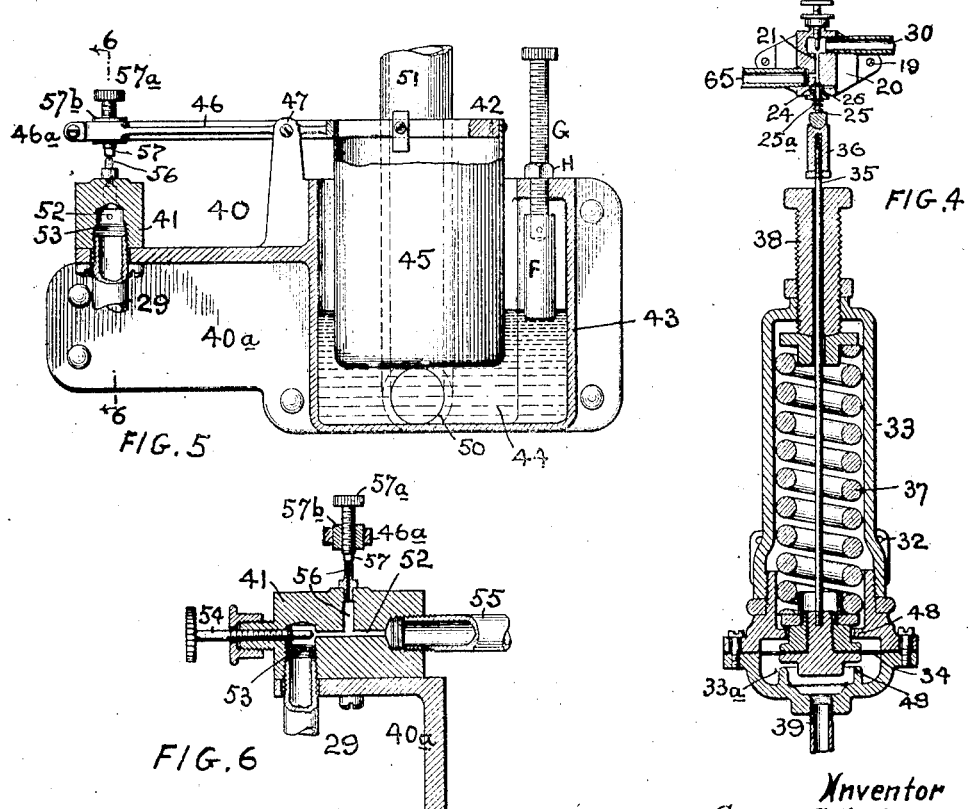

1,617,591

UNITED STATES PATENT OFFICE.

GEORGE C. G. GRAY, OF PHILADELPHIA, PENNSYLVANIA, ASSIGNOR TO AUTOMATIC FUEL SAVING COMPANY, A CORPORATION OF DELAWARE.

AUTOMATIC COMBUSTION CONTROL FOR STEAM BOILERS.

Application filed May 24, 1921. Serial No. 472,102.

The main object of the present invention is to provide a system of draft control for boilers and furnaces working under relatively high pressure, with the special purpose of increasing the efficiency in steam generation, not only in the saving of fuel, but in the maintenance of predetermined pressure conditions under varying consumption duty.

The essential result to be secured is the functioning of the apparatus as a whole to maintain a substantially constant predetermined steam pressure in the boiler or boilers employed in the installation, irrespective of the varying load or steam consumption duty to which the installation is subjected.

The invention herein set out is more particularly an improvement upon the invention of my former Letters Patent No. 1,234,154, dated July 24, 1917, and follows in a general aspect, the character of system therein set out, but with special improvements which increase its efficiency and adapted, not only to single boiler units, but in cases where a battery of boilers for common duty is to be controlled, whether said boiler equipments are provided with stationary grates or with travelling grates employed in automatic stoker apparatus.

In boiler-furnace operation, proper regulation of the air supply is a most important feature, because a materially insufficient or an excessive amount of air, supplied to the fire-bed, will result in heavy efficiency losses; and as hand regulation is undesirable and as a rule is haphazard in its results, it follows that automatic control is most desirable and particularly so, when such regulation is caused to automatically maintain uniform rates of combustion in a plurality of separate furnaces of a battery of boilers in which the fuel bed conditions are relatively varying.

The special object of my invention is, therefore, to provide more perfect automatic control of the air supply and drafts, including the maintenance of a predetermined absolute pressure in the furnace chamber above the fire-bed, than has heretofore been possible, and to extend this improvement to installations involving a plurality of separate boiler furnaces, whether of the stationary or travelling grate type.

In the operation of my improved system, the over-fire draft or vacuum, of whatever predetermined extent required, is substantially maintained continuously in the most efficient manner by automatically varying the air pressure under the grate or grates, as the conditions may require; the chimney or draft damper is moved to pass a greater or lesser quantity of flue gases, and the stoker, if there be one employed, may be variously speeded automatically to meet the varying conditions, to insure the maintenance of the predetermined over-fire draft pressure or vacuum. All of these factors are coordinated, so that simultaneous adjustments are made of coal, air and damper position, but the outstanding feature is the maintenance of the over-fire absolute pressure, whether it be above or below atmospheric pressure, by variation of the air pressure under the grate. In the simultaneous regulation of a plurality of furnaces, such as required by a battery of boilers, the aforesaid method automatically compensates for variation in fuel-bed thickness and condition of the fire, whereby the furnace of each boiler is individually controlled according to furnace conditions thereunder existing, thus insuring for all of the boilers uniform predetermined rates of combustion. This feature distinguishes the system of the present invention from the previous methods employed for maintaining the over-fire draft or vacuum which depend upon variation alone of the damper position, because such operation did not allow for conditions arising from variations in the fuel-bed in the individual boilers in multiple boiler installations.

The present invention may be applied to hand-fired boilers or to boilers equipped with stokers having travelling grates, as preferred or required, and I, therefore, do not confine the invention to any particular character of furnace structure; but in the case of stokers equipped with a travelling grate, the rate of grate travel may be governed under control of the automatic devices forming a part of my invention, and hereinafter fully described.

Boiler capacity is the rate of combustion governed by the volume of gases. The extent of the chimney damper opening, therefore, is a correct indicator of the rate of combustion for each boiler. The starting point of the system, therefore, is draft control; the moving of gases out of the furnace chamber under control of the varying steam pressure and supplying air under the grates for combustion to respond to the steam pressure requirements. The position of the dampers are coordinated to operate simultaneously with any number of boilers constituting the battery. This means that only a definite volume of gases can pass through the damper opening of each boiler. Therefore, every boiler is made to carry its proper share of the steam load duty, because the volume of gases given off by the fuel-bed will be the same, this being due to the maintaining of a predetermined over-fire absolute pressure regardless of the varying thickness and condition of the fuel bed on the different boilers, said predetermined over-fire absolute pressure or vacuum being maintained by varying the air pressure and volume under the grates of the fuel-beds. The control is, therefore, automatic, definite and commensurate with the varying conditions arising from time to time.

Control of the three elements of regulation, namely, the boiler chimney or draft damper, air supply and stoker speed are obtained by means of suitable motor devices whose operations are respectively controlled by the steam pressure in the case of the damper and stoker speed and by the over-fire vacuum in the case of the air supply, all of which are fully described hereinafter.

With the above and other objects in view, the nature of which will be more fully understood from the description hereinafter, the invention consists in the novel construction of automatic combustion control, as hereinafter more fully described and defined in the claims.

Referring to the drawings: Fig. 1 is a general elevation, partly in section, of a steam generator plant embodying my invention; Fig. 2 is an elevation showing control devices arranged in a suitable cabinet and corresponding to those shown at the left hand side of Fig. 1, but on a larger scale; Fig. 3 is a rear view of the structure shown in Fig. 2; Fig. 4 is a vertical section of the steam pressure regulating or control valve device forming a part of the devices illustrated in Fig. 2; Fig. 5 is a vertical section of the combined fluid seal and float and the control bleeder valve, forming a part of the control means illustrated in Figs. 1 and 2; Fig. 6 is a transverse sectional view taken on line 6—6 of Fig. 5; Fig. 7 is a side elevation illustrating a self-feeding stoker having a travelling grate and air control devices adapted for use in connection with my present improvements in lieu of the hand-fired boilers shown in Fig. 1; Fig. 8 is a horizontal sectional view of a portion of the self-stoker illustrated in Fig. 7; Fig. 9 is an elevation of part of the driving mechanism for the stoker; and Fig. 10 is a detail of the air regulating dampers under the travelling grate.

While a large portion of the details of the apparatus herein disclosed are more or less similar to the corresponding parts disclosed in my Patent No. 1,234,154, and require more or less similar explanations, the distinguishing features of the present improvements, which are in addition to or are different from the details of construction set out in the said Letters Patent, will be hereinafter specifically referred to in connection with the drawings and the general description, which will also involve parts of the prior devices.

The system of control, embodying the invention, is adapted for use with any character of steam generator or boiler and with any character of grate construction and, therefore, what is illustrated is by way of example rather than restriction.

For the purposes of illustration, there is shown in Fig. 1, two steam generators 1, 1, of any preferred construction, each having a smoke box 2, a fire-box or combustion chamber 3, a closed ash-pit 4, and a smoke uptake or chimney 5. Leading from the steam generators is the usual steam supply pipe 6 and by a suitable steam connection 8, steam is supplied therefrom to the engine of a pressure blower 7 which supplies air to a conduit A and from which the air supply thus provided is delivered through individual branch conduits B to the ash-pits 4 of the respective generators, the control of the air delivery thereto being secured by means of adjustable valves or dampers C in said branch conduits B and operated under control of the diaphragm motors D. Interposed between the steam supply pipe 6 and the engine of the blower 7, is a diaphragm valve 9 for controlling steam passing to the blower and for regulating its speed and pressure.

As the general construction and equipment of the two generators or boilers is the same, it will suffice, in describing the details, to refer to one of the generators only.

The smoke up-take 5, has therein a suitable draft damper 10, operatively connected with a damper diaphragm motor 11. A description will now be given of the controlling apparatus of the invention which co-operates with the steam generator parts above described for automatically controlling or regulating the draft thereof. In this connection, it may be stated that the steam generator 1, may be located in compartment $a$, and the controlling apparatus may be located in compartment $b$, which latter may be removed at any required distance from compartment $a$.

In the compartment $b$ wherein the control devices are arranged within a cabinet 13, there is also provided a stand 12 on which is arranged an air pressure tank 15 and an air compressor 16 for supplying the said tank with air at a predetermined satisfactory pressure capable of operating the various diaphragm motors 9, 11 and D. The air compressor 16 is steam operated and steam supplied thereto by a pipe 18 extending upward and connecting with the steam supply pipe 6. Leading from the air pressure tank 15, a pipe 28 extends to the rear of the cabinet 13 and communicates through pipe 29 with the air pressure pipes 55 respectively leading to the diaphragm motors D for controlling the operation of the valves C in the air ducts B leading to the respective ash-pits 4 of the generators, and also connects with air pressure pipe 65 which extends to the diaphragm motor 9 for the blower engine, and motors 11 which operate the draft dampers 10 in the smoke flues of the respective generators. Arranged between the pipe 28 and the pipes 55 are the bleeder control devices 40 whose function is to control the escape of compressed air from the pipes 55 to govern the operation of the diaphragm motors D. Similarly, there is arranged, intermediate of the pipes 28 and 65, a bleeder control device 20, whose function is to control the escape of compressed air from the pipes 65 to govern the operation of the diaphragm motors 9 and 11.

In the case of the bleeder control devices 40, they are respectively operated by the over-fire absolute pressure or vacuum conditions in the furnace chambers 3 of the respective generators, whereas the bleeder control device 20 is operated under the varying steam pressure conditions of the generators, as evidenced in the steam supply pipe 6. The details of these control devices will now be described.

The bleeder control device 20 (Fig. 4) is secured in position by screws 19 and has therein a two-part supply passage 21, the passage parts being arranged at right angles to each other, a controlling screw 23 being present at the juncture of the pasage parts for regulating purposes. Having communication with the supply passage 21 and beyond the screw 23, is a valve chamber 24, having an opening in its side to the atmosphere. A valve stem 25 extends upward into the valve chamber 24 and shaped at its top to form a valve 26 which is adapted to control communication from the passage 21 to the atmosphere.

Normally, a sensitive spring 25ª holds the valve 25 in open position and bleeds the line pipe 65 of the pressure due to the compressed air therein, leaving the diaphragm motors 9 and 11 inactive and corresponding to positions as when starting up the plant or when the steam pressure had fallen below the normal pressure. The above described bleeder control device has its passage 21, on opposite sides of the adjusting screw 23, connected with the respective pipes 30 and 65; and that portion of the passage 21 connected with pipe 65 between the screw 23 and pipe 65 is open to the atmosphere through the valve controlled chamber 24. The bleeder valve is operated by the following means: The casing 33 is secured to the cabinet wall by a flanged plate 32 and is provided at the bottom with a diaphragm 34 which is enclosed by a bonnet 33ª forming a steam chamber, which has communication with the steam pipe 6 by branch pipe 39. The diaphragm 34 is provided with an upwardly extending stem 35 which projects from the top of the casing and is furnished with an adjustable head 36 upon which the valve rod rests and in contact with which it is maintained by the spring 25ª. The pressure of the steam on one side of the diaphragm 34 is counter-acted on the other side by a spring 37 held within the casing. The tension of the spring may be adjusted by the adjusting screw 38 to prevent closure of the bleed valve 25 until a predetermined maximum steam pressure has been reached in the boilers and supply pipe 6. It will now be understood that when the maximum boiler pressure has been reached, the bleeder control valve 25 will be closed and the air pressure in the pipe 65 be caused thereby to increase with the result that diaphragm motors 9 and 11 will be actuated to respectively slow down the blower, and close the draft dampers 10 to reduce the furnace temperatures and check the rise in steam pressure. As the steam pressure falls, the reverse operation takes place and as the bleed relief allows the air pressure in pipe 65 to fall; the diaphragm motors are exhausted and the blower is caused to speed up and draft dampers to open. The steam pressure is shown on a steam gauge 60 in the cabinet 13, it being connected with the steam pipe 39 leading from the steam main 6.

I further point out that the construction of steam pressure controller here described is so made that excessive pressure cannot be passed on to the bleed valve 25, this being guarded against by the fact that a very small capacity for movement of diaphragm 34 is provided, the metal parts 34ª attached to the central part of the diaphragm being limited in their play by the flange parts 48 and 49 of the casing. Furthermore, the head 36 is adjustable on the rod 35 to permit accurate adjustment of leak valve 25 to its seat in chamber 24 so as to be effective for very small variations in the boiler steam pressures.

Referring now to the bleeder control devices 40 for controlling the air delivered to the ash-pits below the grates of the respective generators, the bracket 40ª terminates at one end in and has preferably formed integral therewith a cup-shaped receptacle 43, containing a liquid seal 44, preferably of oil. Within the receptacle 43 is a float 45, open at the top, as at 42, and having secured thereto an arm which is delicately fulcrumed at 47. As shown in Fig. 5, the receptacle 43 has, near its bottom, an opening 50, and connecting therewith and with the fire-box or furnace chamber 3 of the generator, is a pipe 51. Pressure of gases within the furnace chamber 3, serves to influence the float 45 of the receptacle 43, the purpose of which is later set out. Referring to the control bleeder valve 41, and considered transversely, there is shown as extending therethrough (Fig. 6), a horizontal passage 52; and communicating therewith is a vertical passage 53, provided with a screw throttling device 54 for regulating the speed of flow of compressed air through the bleeder valve. In this connection, it is to be noted that the branch pipe 29, hereinbefore referred to, which extends from the pipe 28 leading to reservoir 15, communicates with the vertical passage 53 of valve 41; also that leading from the passage 52 of said valve is the pipe 55 for conveying the compressed air to the diaphragm motor D which operates the blast valve C within the branch air conduit B to the ash-pit 4 of the steam generator 1. Extending vertically from the passage 52 and communicating with the atmosphere is a bleed passage 56, an apertured nipple being provided to insure a good seat. To the under side of the arm 46, and immediately above the passage 56 is a valve 57, for intermittently closing said passage 56 as the float 45 moves up or down and oscillates the arm upon its fulcrum 47. The valve 57 is made adjustable by being on the lower end of the screw threaded part 57$^a$, the latter carried by an adjustable block 57$^b$ clamped at 46$^a$ on the arm 46.

Also located within the cabinet 13, is a draft gauge 58, having connection with pipe 51 and adapted to indicate the pressure condition within the furnace chamber 3. A gauge 59 is also present within the cabinet, to indicate the working air pressure for operating the diaphragm motors, derived from the reservoir 15 through a pressure reducing valve 31 (Fig. 1).

As pointed out, where there are a plurality of generators, a single steam actuated controller 33 will suffice for all of the draft dampers 10, the blower 7 and stoker speed control, but on the other hand, the blast dampers C and absolute pressure or vacuum condition of the furnace chamber requires a separate controller 40 and gauge 58 for each generator.

Aside from the capacity of adjustment of the valve 57 to properly seat on the leak port 56, I provide means for regulating the level of the oil 44 in the receptacle, said capacity for adjustment making the controller exceeding sensitive and responsive to very slight changes in over-fire absolute pressure or vacuum in the furnace chamber 3. The means for regulating the oil level in receptacle 43, comprises a displacement plunger F carried on the lower end of a screw G adjustable in a flange of the receptacle and held in adjustment by the lock-nut H, all as shown in Fig. 5. By adjusting the plunger F to displace the oil 44, its level may be changed and the action of the float made to respond to very small pressure changes in the furnace chamber, said sensitive response being also applicable to the action of the valve 57 in its control of the leak from port 56. While the construction of adjustable displacing plunger shown is well suited to the requirements, the variation in the level by way of adjustment may be made in any other suitable manner if so desired, while maintaining the principle of my invention. The importance of these capacities for adjustment will be appreciated when it is remembered that the over-fire pressure variations are exceedingly slight and must be effective in making the leak control responsive; and further that general approximate adjustment may be made by the screw 57$^a$ and the final adjustment made by displacing the oil level while the system is in operation and at a time it is not feasible to adjust the screw 57$^a$.

The pressure indicating gauge 58 for indicating the extent of absolute pressure or vacuum in the furnace is of a fluid type and is set oblique so as to give a large movement of the fluid for a relatively small pressure variation.

I have described the furnace air controller 40 and its adjuncts in connection with one of the boilers or generators 1, and it is to be understood the same explanations will equally apply to the other controller 40 in respect to the other boiler or generator, each acting independently in respect to controlling the operation of its own air damper or valve C for controlling the air supply below the grate.

In Fig. 1, I have shown separate diaphragm motors 11 for actuating the draft dampers 10 of the two generators, but this is not essential, as the dampers may be connected by a rod 11$^a$ and simultaneously operated by a single diaphragm motor 11, as shown in Fig. 1$^a$. When I refer to the parts 8, 11 and D as diaphragm motors, I am referring to these parts in the sense that they are preferred motors actuated by fluid pressure, such as compressed air, and am not meaning to restrict myself to the use of any particular type of motor for actuating the dampers or valves.

The foregoing description has been made with respect to the hand-fired furnaces of the generator, but as before pointed out, these furnaces may be of self-stoker types operating under regulated speeds, and I have shown in Figs. 7 and 8 such a stoker by way of example. Referring to these illustrations, E' is the travelling grate of any suitable construction and which may be driven by sprocket wheels by power devices as customary. One of the modes of driving by power devices is illustrated in Figs. 7 and 9 and comprises a worm-wheel 61 on the sprocket wheel shaft, a worm and shaft 62 driving the worm-wheel, mitre gears 63 to rotate the worm, a ratchet wheel 64 to rotate the mitre gears, a rocking lever 65 having a pawl 68 for driving the ratchet wheel, a rod 66 adjustably hinged at 66a to the lever 65 to rock it and extending upward to an eccentric 67 by which it is reciprocated, said eccentric carried by a power driven shaft 67a. By adjusting the connection 66a any maximum speed may be given to the grate. To reduce this speed, any suitable means may be employed under the control of a diaphragm motor F operated by the air pressure in pipe 65 and under the bleed control device 33 which is responsive to steam pressure changes of the generators. A convenient means for this purpose is an arm 69 which controls the time of engagement of the pawl 68 with the ratchet wheel, so that the reciprocations of the arm 65 carrying the pawl will cause the ratchet wheel 64 to be intermittently rotated at a lesser speed when necessary, as when there is too high a steam pressure. Any other suitable means may be employed for automatically controlling the speed of travel of the stoker grate, if so desired, as I do not restrict myself in this respect.

In connection with the stoker shown, 7 represents an air blower and may be controlled by a diaphragm motor 9 as in the case of Fig. 1. The air passes through a duct B into the space 70 below the fire-bed and between the upper and return portions of the endless grate, the air passing through the duct being controlled, if desired, by the blast damper or valve C which is controlled by the diaphragm motor D, as in Fig. 1. If there are a plurality of stokers and generators, then a single air blower will suffice for all and there will be a plurality of air ducts B and blast valves, all as in Fig. 1. Because the space between the upper and return portions of the grate is relatively shallow vertically and long horizontally and the fire-bed is under different conditions along the grate from front to rear, the space below the grate is zoned into compartments so that the air pressure in each zone is regulated to the varying depths and stages of progressive combustion. To accomplish this zoning, I prefer to provide dampers 71 respectively to the front and rear of the air duct B and these may be adjusted to permit more or less air to pass to the different portions of the fire-bed to insure more perfect and uniform combustion. The adjustment of each of these dampers 71 may be by shaft 72, hand wheel 73 and locking means 73a comprising a bracket and bolt, the latter fitting any one of a number of holes in the hand wheel. The dampers 71 are made a part of the stoker and may be drawn forward with it, and to permit this, the shafts 72 have sockets 72a which may be uncoupled from the dampers by shifting the shafts 72 longitudinally outward for this purpose. Additional hinged dampers 74 and 75 may be arranged in the ash-pit below the stoker grate and respectively below the dampers 71 above referred to, to prevent by-passing of the air blast.

The operation may be briefly stated as follows:—The controllers 40 are first adjusted for any predetermined over-fire vacuum which has been decided upon as most desirable and thereafter they operate to control the diaphragm motors D to regulate the air supply to the grates and in this way restore and substantially maintain the correct vacuum over the fire at all times. As these controllers 40 are very sensitive in their action, their response to very slight variations in the vacuum is so quick that no material variation can take place before the corrective measures are put into action by the under-grate air blast regulation. To illustrate: Upon a sudden demand for more steam, indicated by a fall in pressure in the steam main 6, the steam actuated controller 33 responds and opens the draft dampers 10, and the greater the damper opening, the greater is the vacuum in the furnace chamber increased, which in turn registers through the over-fire vacuum pipe 51 connected to the controller 40. The increased vacuum lowers the oil level in the chamber 43 carrying the float 45. The downward movement of the float causes the leak port 56 to open, bleeding the air pipe 55 to the atmosphere. The diaphragm motors D then collapse and the blast gates or dampers C open and supply more air to the grates to build up the under-grate pressure and thus bring the over-fire vacuum back to predetermined pressure. At same time, the controller 33 will have caused the diaphragm motor valve 9 to speed up the blower to increase the air supply and if automatic stokers are employed, to speed them up also. Under these conditions the steam pressure of the generators increases and when it reaches normal pressure, the controller 33 again responds to the conditions and causes the dampers 10 to be more or less closed, the blower speed to be reduced and the stoker speed lowered. The controllers 40 immediately respond to adjust the gates or blast dampers to insure predetermined vacuum to be restored and maintained in chamber 3. Thus the under-grate pressure is increased and each furnace given individual treatment in accordance with its special requirements. The furnace with the highly resistant fuel-bed will have a higher under-grate pressure while the furnace with the less resistant or thinner fuel-bed will have a lower under-grate pressure. The over-fire vacuum remains substantially constant and efficient combustion takes place under varying conditions of furnace and boiler load. The entire operation is rapid and automatically accomplished. Each boiler in the battery carries its proper share of the whole load and the individual air control to each furnace results in maintaining a higher percentage of carbonic acid and an efficient operating condition in every boiler of the battery.

This system automatically changes the under-grate air pressure to maintain a constant over-fire vacuum, and to supply the proper amount of air for correct combustion through any thickness of fuel bed; and it, further, may control the extent of the fuel delivery to the furnace by control of the grate speed or otherwise.

It will now be apparent that I have devised a novel and useful construction which embodies the features of advantage enumerated as desirable, and while I have in the present instance shown and described the preferred embodiment thereof which has been found in practice to give satisfactory and reliable results, it is to be understood that I do not restrict myself to the details, as the same are susceptible of modification in various particulars without departing from the spirit or scope of the invention.

Having thus described my invention, what I claim as new and desire to secure by Letters Patent, is:—

1. An automatic stoker provided with an endless travelling grate, combined with means for supplying air pressure between the upper and lower portions of the grate, and wherein the space between the upper and lower travelling portions of the grate is divided into zones by pivoted transverse dampers having means for adjusting them to put the several air zones within the travelling grate itself into more or less direct communication to control the distribution of the air below the fire-bed.

2. A steam boiler having an automatic stoker provided with a travelling grate, combined with means for delivering air into the space between the upper and lower travelling portions of the grate and substantially midway between the front and rear portions thereof, and adjustable dampers arranged in the space between the upper and lower portions of the grate on each side of the middle of the aforesaid space into which the air is delivered, said dampers dividing the space under the grate into three zones and made adjustable for permitting air in regulated quantities to pass from the middle zone into the spaces constituting the other two zones to regulate the air blast to the forward, middle and rear portions of the fire-bed to suit the varying conditions as to depth and temperature thereof.

3. The invention according to claim 2, wherein the zone dampers are provided with detachable means extending to the outside of the furnace wall for adjusting them and holding them in definite positions of adjustment and also permitting of disconnection, whereby the dampers may be withdrawn with the stoker from the furnace chamber.

4. The invention according to claim 2, wherein it is further provided with a power driven blower for providing the air blast for the grate, and controlling means affected by the varying pressure conditions of the furnace chamber above the fire bed for automatically regulating the supply of air to the middle zone of the space under the grate.

5. A steam boiler having an automatic stoker provided with a travelling grate, combined with means for distributing air in the space between the upper and lower travelling portions of the grate to constitute a plurality of air pressure zones, means for supplying air under pressure and controlling its quantity under the control of the variations in pressure in the combustion chamber above the grate, and means for controlling the relative air supplied to the several zones.

6. The invention according to claim 5, wherein further, means are provided for varying the speed of the stoker grate under the control of variations in the boiler pressure and independently of the variations in the air supply to the grate.

7. A boiler having a chimney draft damper, in combination with means actuated under variations in the boiler steam pressure for controlling the draft dampers to increase the draft when the steam pressure falls and decrease it when the pressure rises, and means to supply air under pressure to the furnace below the grate thereof, said means comprising a motor driven air blower, and means under the control of the over-fire absolute pressure in the furnace chamber for governing the operation of the pressure blower for varying the quantity of air to be delivered below the grate.

8. A boiler provided with a travelling grate having an air chamber between its upper fire bed supporting portion and the lower return portion, a chimney draft damper, means controlled by the varying steam pressure of the boiler for automatically operating the chimney draft damper whereby the same is opened in respect to a fall in the steam pressure, means for dividing the space within the travelling grate into a plurality of zone chambers for supplying air to the fire-bed, an air chamber extending from the space below the grate for delivering air into the zone chambers, adjustable means for regulating the relative quantity of air delivered into the respective zone chambers to suit the particular requirements of the portions of the fire bed immediately above said chambers, and means under the control of the variations in the absolute pressure of the furnace chamber above the fire bed for controlling the volume of air delivered to the air chamber, whereby the air delivered to different portions of the fire bed is in accordance with the variations in the depth and temperature conditions of said bed.

In testimony of which invention, I hereunto set my hand.

GEORGE C. G. GRAY.